United States Patent [19]

MacInnis

[11] Patent Number: 5,380,499
[45] Date of Patent: Jan. 10, 1995

[54] COMBINED HEAT EXCHANGER AND AMMONIA INJECTION PROCESS

[75] Inventor: James M. MacInnis, Copley, Ohio

[73] Assignee: The Babcock & Wilcox Company, New Orleans, La.

[21] Appl. No.: 76,994

[22] Filed: Jun. 15, 1993

[51] Int. Cl.$^6$ .............................................. B01J 8/02
[52] U.S. Cl. ..................................... 422/173; 422/177; 422/211; 423/239.1
[58] Field of Search ............... 422/172, 170, 171, 173, 422/177, 211, 235, 234; 423/244 R, 239, 239.1, 235; 95/40

[56] References Cited

U.S. PATENT DOCUMENTS

| | | | |
|---|---|---|---|
| 4,678,643 | 7/1987 | Fetzer | 422/172 |
| 4,981,660 | 1/1991 | Leach | 423/235 |
| 4,999,167 | 3/1991 | Skelley et al. | 422/172 |
| 5,057,293 | 10/1991 | Epperly et al. | 423/235 |

FOREIGN PATENT DOCUMENTS 2192624  1/1988  United Kingdom ............... 422/172

*Primary Examiner*—Amalia L. Santiago
*Attorney, Agent, or Firm*—Daniel S. Kalka; Robert J. Edwards

[57] ABSTRACT

A method for injecting an aqueous ammonia into a flue gas for reducing NO$_x$ in the flue gas comprises providing at least one tube pass in a path of the flue gas. As the vaporized aqueous ammonia and air mixture passes through the tube, it is injected into the flue gas. The flue gas raises the temperature of the remaining vaporized aqueous ammonia mixture for later use in vaporization of the aqueous ammonia.

8 Claims, 2 Drawing Sheets

COMBINED HEAT EXCHANGER AND AMMONIA INJECTION PROCESS

BACKGROUND OF THE INVENTION

1. Field of the Invention

The present invention relates in general to reducing nitrogen oxide ($NO_x$) levels in flue gas, and, in particular to a new and useful method and system for converting $NO_x$ to nitrogen gas ($N_2$) through a combined heat exchanger and ammonia injection process.

2. Description of Related Art

In the power plant field, a flue gas stream is formed during the combustion of fuels such as coal, oil, natural gas, petroleum coke, etc., which are burned by electric power generating plants and many other industrial processes.

In these fields, it is common to use a selective catalytic reduction (SCR) reactor for removing $NO_x$ from the flue gas. The $NO_x$ removal process involves introducing an ammonia reagent into the flue gas for use in the SCR. There are several known methods used to remove $NO_x$ from the flue gas in SCR reactors.

A first known method uses anhydrous ammonia in order to reduce $NO_x$ levels. With a relatively small amount of energy, the anhydrous ammonia can be evaporated with either an electric source or with steam coils. The vaporized ammonia is then diluted with air in order to provide an adequate mass necessary to distribute the ammonia reagent evenly over a large ductwork cross-section. In this method, the diluted ammonia and air mixture is delivered to a grid of injection pipes located in the flue gas ductwork and upstream of a SCR catalyst bed. The injection pipes span the width of the flue gas duct and are closed at one end. The ammonia and air mixture is injected into the flue gas through nozzles or orifices that are sufficiently spaced along the injection pipes in order to provide an even distribution and thorough mixing of the ammonia with the flue gas. Major disadvantages associated with using this method include the safety concerns and precautions pertaining to the handling and storage of the anhydrous ammonia. Especially in highly populated areas, local government regulations often require that aqueous ammonia be used instead of anhydrous ammonia.

A second method for reducing $NO_x$ levels is to use an aqueous ammonia with an external heat source in order to evaporate the aqueous ammonia. The aqueous ammonia used is typically purchased in industrial grade form and is approximately 30% by weight ammonia and 70% by weight water. A dedicated heater, usually an electric-type heater, is used to heat dilution air to a level which is adequate enough to vaporize the ammonia and water mixture. A vaporization chamber or static mixer is the medium in which the phase change occurs. Usually, atomization air is required to assist in the break-up of the aqueous ammonia in order for fine droplets of the aqueous ammonia to enter the vaporization chamber. After vaporization, the ammonia and water air mixture exits the vaporization chamber and is delivered to an injection grid for injection into the flue gas as described above.

A major disadvantage associated with this method is that there is a parasitic power demand caused by the dilution air heater. A typical installation can have heater power demands ranging in the hundreds of KW range. Furthermore, there is great cost associated with this method due to the capital cost of the air heater and associated controls and hardware. Additionally, there are several maintenance problems associated with this method, particularly, burned-out heating elements which lead to costly maintenance down time.

A third method is to use an aqueous ammonia with the flue gas as the dilution and heating medium. This method comprises taking a hot slip stream of the flue gas from the ductwork, upstream of the SCR reactor, and in turn sending it through a vaporization chamber or static mixer. As described in the second known method above, the aqueous ammonia is injected into the vaporization chamber with atomization air in order to facilitate the phase change. As previously described, the ammonia-water-flue gas mixture exits the vaporization chamber and is delivered to an injection grid.

The major disadvantages associated with this method include the costly need for ductwork and insulation and the limited application for this method. This method is limited to "clean" flue gas which has nearly no dust, ash or sulfur oxides. Flue gas containing dust and ash is certain to clog or plug the small injection orifices in the injection pipes. Additionally, sulfur oxides form ammonium sulfate and bisulfate salts which cake on the spray nozzle in the vaporization chamber and plug the injection orifices of the injection pipes.

A fourth known method for reducing $NO_x$ in a flue gas is to spray aqueous ammonia directly into the flue gas upstream of the SCR catalyst bed. In this method, the aqueous solution is sprayed into the flue gas upstream of the catalyst bed in a manner similar to the way reagent is introduced into a selective non-catalytic reduction process (SNCR) in which a liquid ammonia derivative is sprayed in boiler high temperature regions in order to accomplish $NO_x$ reduction. The energy from the flue gas is used to accomplish the phase change.

A major problem associated with this method is that great residence time is required in order to vaporize the water and ammonia. Additionally, there is insufficient distance upstream of the catalyst bed for placing the injection pipes. This is further complicated by the requirement of protecting the SCR catalyst from liquid water in order to avoid contamination.

Through this method, the need to provide carrier mass is not met which means that the number of total nozzles in the cross-section of the flue gas is limited. Thus, this method limits the capability to have a uniform injection distribution. Furthermore, because the injection pipes are hot, the phase change occurs within the injection pipe before the reagent reaches the nozzle. This further inhibits the effort to achieve ammonia a uniform distribution.

SUMMARY OF THE INVENTION

The present invention comprises a method for injecting a vaporized aqueous ammonia into a flue gas for reducing $NO_x$ in the flue gas by providing at least one tube pass in a path of the flue gas. The vaporized aqueous ammonia and air mixture is circulated through the tube pass for injection of some of the mixture into the flue gas while the flue gas raises the temperature of the remaining vaporized aqueous ammonia mixture. The remaining vaporized aqueous ammonia mixture is later used for vaporization of the aqueous ammonia.

The present invention also comprises a system for injecting a vaporized aqueous ammonia mixture into a path of the flue gas comprising at least one tube pass disposed in the path of the flue gas and having at least one inlet, at least one injection port and at least one return. The inlet provides a vaporized aqueous ammonia and air mixture through the tube pass for injection of some of the mixture into the flue gas. The injection port injects the vaporized mixture into the flue gas and the remaining portion of the vaporized mixture is heated by the flue gas for later use in vaporization of the aqueous ammonia.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
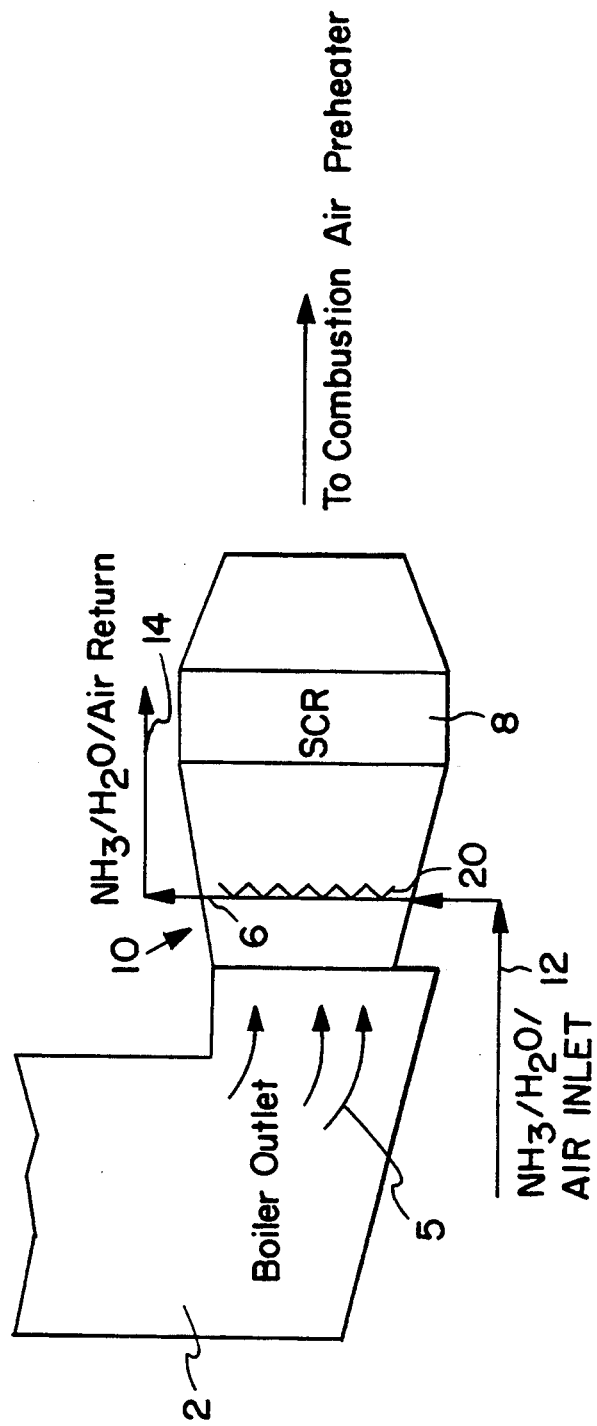
FIG. 1 is a schematic view of a placement of the present invention.

The present invention is a combined heat exchanger and ammonia injection process and system which allows the use of aqueous ammonia as a reagent for reducing $NO_x$ levels in a flue gas while using the energy from the flue gas to accomplish the vaporization of the aqueous ammonia. Unlike the known methods which utilize aqueous ammonia for reducing $NO_x$ levels, the present invention uses the flue gas energy to vaporize the ammonia prior to the injection of the aqueous ammonia without introducing the flue gas into the injection system. As illustrated in FIG. 1, this is accomplished by providing a grid system generally designated 10 for circulating a vaporized aqueous ammonia and air mixture in a flue gas path 5 at a boiler outlet 2. The injection grid/heat exchanger 6 is located in the flue gas path 5 and upstream or before a selective catalytic reduction (SCR) reactor 8. The injection grid/heat exchanger 6 has an inlet 12 for receiving the vaporized aqueous ammonia and air mixture. This mixture is circulated through the injection grid/heat exchanger 6. The energy from the flue gas 5 raises the temperature of the vapor mixture. Any vaporized mixture which remains in the injection grid heat exchanger 6 exits the grid 6 through an outlet or return 14 for recycling back into the injection grid 6. The heat energy of the vaporized aqueous ammonia mixture is used by a vaporizer 30 which is later described.

Figure 2:
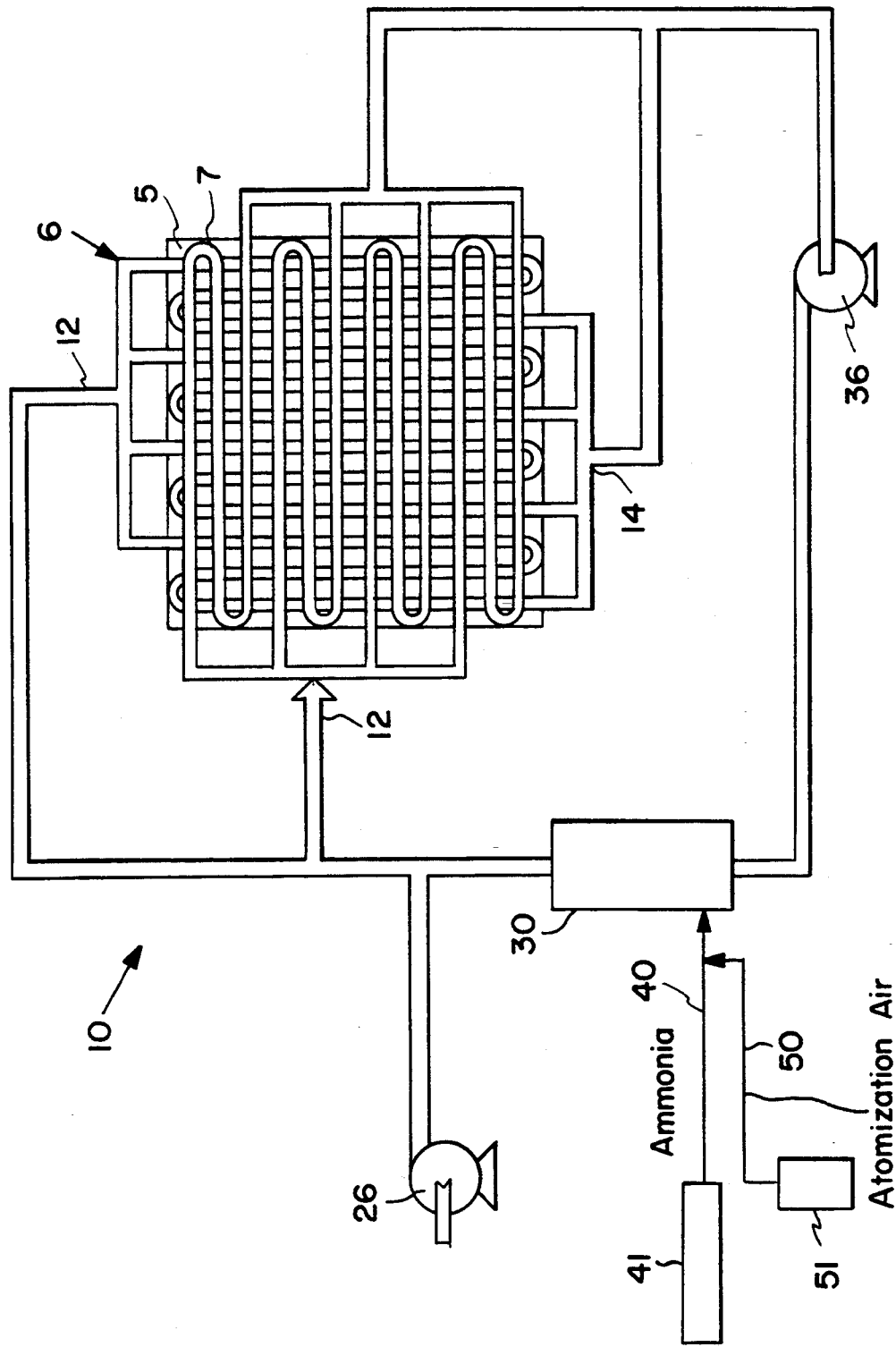
FIG. 2 is a schematic view of the system according to the present invention of FIG. 1.

As shown in FIG. 2, the injection grid/heat exchanger 6 is a grid comprising a series of tube passes, which may be finned tubes located in a flue gas path 5. As the vaporized aqueous ammonia and air mixture is circulated in the grid 6 over the flue gas path 5, a required amount of the vaporized mixture is injected into the flue gas path 5 by the injection ports 20 which are positioned throughout the flue gas path 5. A hot gas recirculating blower or fan 36 is connected to the system 10 at the return 14 for forcing the vaporized aqueous ammonia and air mixture through the system 10. A vaporizer 30, such as a vaporization chamber, is used by the system 10 for receiving the remaining vaporized mixture which exits the grid 6 at the return 14 in order to vaporize the required aqueous ammonia. The vaporization chamber 30 is supplied with aqueous ammonia 40 from an ammonia source 41 along with atomization air 50 from an air source 51.

A make-up air fan or blower 26 is used in conjunction with the system 10 for adding make-up air to the mixture which exits the vaporization chamber 30. Of course, fan 26 in another embodiment may be positioned upstream of vaporizer 30. This resulting mixture is delivered to the inlets 12 of the injection grid/heat exchanger 6 which completes the circuit of the system 10 according to the present invention. All piping and equipment which is not located inside the flue work is adequately insulated.

The make-up air fan 26 can be a fan which can be smaller than the fan 36 and can be a cold gas fan in order to supply the make-up air and system static pressure for accomplishing the desired injection volumetric flow rate.

The injection grid/heat exchanger 6 differs from known injection grids in that the injection pipes 7 pass across the flue gas duct 5, for example in one embodiment in an S or U-shaped configuration, in order to accomplish the required heat transfer. Known injection pipes have a common feed header running in parallel across the duct and terminating at the other end of the duct. According to the present invention, the injection grid/heat exchanger 6 also differs from the known systems in that the injection flow is only a portion of the total flow being passed through the circuit loop rather than terminating in the flue gas duct 5 or flue itself.

One unique feature of the present invention is the circulation of the vaporized ammonia-water-air mixture through the system 10. Current systems employing ammonia injection for this application have utilized an open circuit process. By circulating the reagent, as performed by the present invention, energy transfer from flue gas to dilution medium is possible by utilizing equipment that is already in the duct. Thus, it is not necessary to install additional heat transfer equipment in the boiler in order to extract heat energy from the flue gas.

The present invention also lowers capital costs by eliminating the need for expensive ductwork and insulation associated with routing flue gas for dilution and heating medium. The present invention gains the benefits of the tremendous flue gas energy without the costs of moving the flue gas. An electric heater with associated controls and hardware, which is common in the known systems, is not required.

The present invention is also applicable to a wide range of applications. Because the dilution medium is clean, this process can be used for coal, oil, and any other boiler applications requiring SCR $NO_x$ removal equipment.

Also, the present invention has a low parasitic power demand. Thus, operational costs are reduced drastically with this method. The energy lost from the flue gas in the "back end" of the boiler is so small that it must be considered negligible. The expected temperature drop of the flue gas is expected to be less than 2 degrees. In fact, there is a comparable energy loss to the flue gas in the back end of the boiler given the current methods. This is because the flue gas heats the injected mixture. The heaters currently used to heat the dilution air draw electricity that the user could sell in the case of a utility, or that simply add to operating costs in the case of an industrial application.

Additionally, the present invention requires less maintenance. Electric heating elements, which are a common place in known systems, have a tendency to burn out, especially when toggled on and off, which is the case often in a typical control situation.

Because the present invention utilizes aqueous ammonia, the system meets local regulations in certain areas. The present invention reduces the cost of aqueous ammonia injection system in comparison to an anhydrous system.

Furthermore, the present invention allows for uniform injection distribution. The present invention includes all of the advantages of known systems with respect to uniform injection distribution across the face of the duct. By using carrier air and having a sufficient number of pipe and orifices, adequate distribution is ensured.

While a specific embodiment of the invention has been shown and described in detail to illustrate the application of the principles of the invention, it will be understood that the invention may be embodied otherwise without departing from such principles.

What is claimed is:

1. A system for injecting an aqueous ammonia mixture into a flue gas to reduce nitrogen oxides the system comprising:
   a duct for receiving a flue gas
   an aqueous ammonia source;
   an air source;
   mixture means connected to the aqueous ammonia source and to the air source for vaporizing the aqueous ammonia from the aqueous ammonia source and forming a vaporized ammonia and air mixture;
   at least one tube pass disposed in the flue gas duct, said at least one tube pass having at least one inlet, at least one injection port and at least one return, the at least one inlet being connected to the mixture means for receiving the vaporized ammonia and air mixture, the vaporized ammonia and air mixture being circulated through the at least one tube pass for injection of some of the mixture into the duct and flue gas therein by the at least one injection port, the at least one return being connected to said mixture means for returning a remaining portion of the vaporized ammonia and air mixture from the at least one tube pass back to the mixture means; and
   a selective catalyst for reducing nitrogen oxides located in the flue gas duct downstream of that at least one tube pass, the ammonia reducing the nitrogen oxides in the flue gas in the presence of the catalyst.

2. The system according to claim 1, including circulating means connected between the at least one inlet and the at least one return of the at least one tube pass for circulating the vaporized ammonia and air mixture through the system.

3. The system according to claim 2, wherein the circulating means comprises a fan.

4. The system according to claim 2, wherein the circulating means comprises a blower.

5. The system according to claim 1, wherein the mixture means comprises a vaporizer.

6. The system according to claim 5, further comprising make-up air means for providing make-up air to the system, said make-up air means being positioned downstream of said mixture means.

7. The system according to claim 1, wherein the at least one injection port includes a plurality of injection ports.

8. The system according to claim 1, wherein the at least one tube pass includes a plurality of tube passes.

* * * * *